United States Patent [19]

Flora

[11] Patent Number: 4,936,205
[45] Date of Patent: Jun. 26, 1990

[54] MACHINE FOR DESTEMMING CHERRIES

[75] Inventor: David A. Flora, Kalamazoo, Mich.

[73] Assignee: Dunkley International, Inc., Kalamazoo, Mich.

[21] Appl. No.: 233,009

[22] Filed: Aug. 17, 1988

[51] Int. Cl.$^5$ ...................... A23N 15/00; A23N 15/02
[52] U.S. Cl. .................................. 99/637; 99/635; 99/643; 198/382; 198/631
[58] Field of Search .................. 99/635–637, 99/639, 641, 593, 616; 56/121.4, 121.44, 121.46; 198/382, 383, 394, 631; 426/481, 484

[56] References Cited

U.S. PATENT DOCUMENTS

| | | | |
|---|---|---|---|
| 1,011,444 | 12/1911 | Kihlgren | 198/631 |
| 1,198,985 | 9/1916 | Ackerman | 99/635 |
| 2,668,619 | 2/1954 | Wormser et al. | 99/639 |
| 2,731,051 | 1/1956 | Wormser et al. | 99/639 |
| 2,770,273 | 11/1956 | Schmidt | 99/635 |
| 3,174,520 | 3/1965 | Van der Vijver | 99/639 |
| 3,646,978 | 3/1972 | Tait | 99/639 |
| 3,669,164 | 6/1972 | Cox | 99/637 |
| 3,677,315 | 7/1972 | Cox | 99/643 |
| 4,252,056 | 2/1981 | Altman | 99/637 |
| 4,503,966 | 3/1985 | Papalexis et al. | 198/382 |

FOREIGN PATENT DOCUMENTS 1559475  1/1980  United Kingdom ................. 99/637

Primary Examiner—Timothy F. Simone
Attorney, Agent, or Firm—Price, Heneveld, Cooper, DeWitt & Litton

[57] ABSTRACT

A machine for destemming cherries has a base frame and a fruit transport frame. The fruit is moved over the transport frame on an endless belt. A stem wiper blade is rotated just above the surface of the fruit. A source of rapid horizontal motion is provided for the transport frame to cause the fruit to rotate so that the stems will be erected into the path of the blade during the passage of the fruit beneath the blade whereby the blade can detach the stems from the fruit. The transport frame is mounted on motion absorbing supports which also convert the circular movement of the motion source into ellipsoidal motion with the greater axis parallel to the direction of travel of the belt.

7 Claims, 4 Drawing Sheets

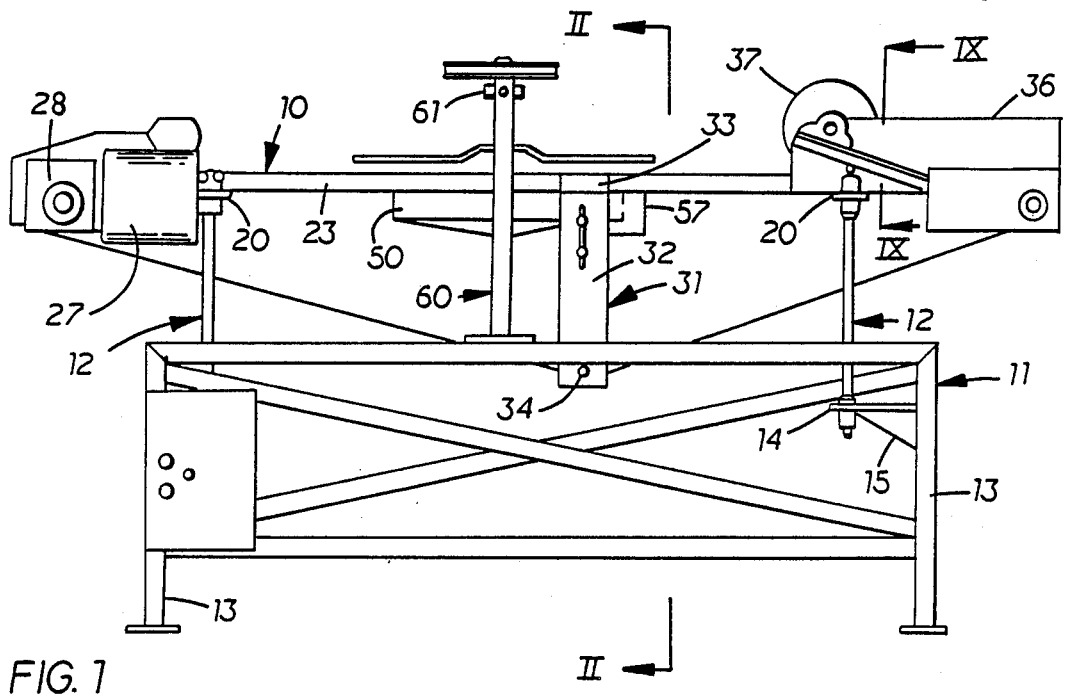
FIG. 1
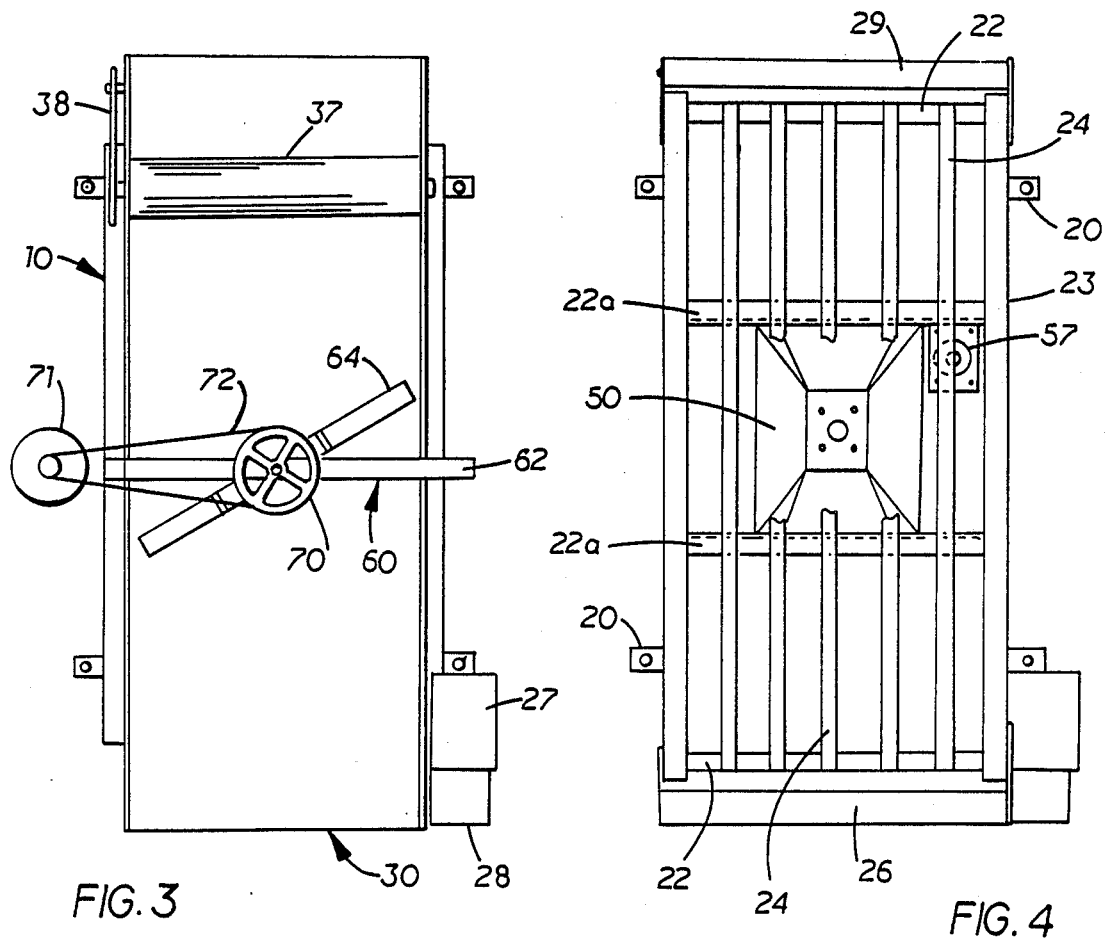
FIG. 3
FIG. 4

MACHINE FOR DESTEMMING CHERRIES

FIELD OF THE INVENTION

This invention relates to fruit processing equipment and more particularly to a machine for removing the stems from cherries.

BACKGROUND OF THE INVENTION

Using current agricultural techniques, cherries are no longer hand picked but are removed from the trees when at the correct stage of ripeness by shaking the tree, causing the cherries to fall into a gathering mechanism placed beneath the tree. Thus, the care which could be exercised by an individual doing the picking to remove only the cherries and not their stems has been eliminated. Thus, if the cherries are separated from the tree at the base of the stem rather than by separation of the fruit itself from the stem, the cherries will retain their stems after picking. This is true of a significant proportion of the cherries shaken from the trees. Thus, later in the processing of the cherries, whether for consumption fresh or for canning, these stems must be removed because they are not a desirable, edible part of the fruit. Furthermore, they are definitely undesirable if they end up in a cherry pie or the like. Further, the fruit, as it is received at a processing facility, is a mixture of cherries with stems and cherries without stems and there is no practical mechanism for separating one from the other. Therefore, it is necessary to have equipment which will destem those of the cherries which have retained their stems and allow the already unstemmed cherries to pass through. Further, as a matter of economics, this must be done automatically by mechanical equipment because the use of hand labor for this purpose is far too costly to be acceptable.

One of the problems in using mechanical destemming is the necessity of making the cherries place their stems in a position where mechanical equipment can remove them. To do this, the cherries are passed over a surface where they are subjected to constant and vigorous shaking which causes the cherries to rotate and, as a result, be turned to a position in which the stem is erected above the bed of cherries so that it is in a position to be mechanically detached and removed. This has been done by equipment which shakes a bed on which there is spread a single layer of cherries. This shaking process, however, is very undesirable in existing equipment because the motion is transmitted to the surrounding equipment and building and is, therefore, noisy and becomes the source of excessive vibration which is tiring to personnel, resulting in fatigue. It is also damaging to other equipment and to the building and its floors. It is the object of this invention to provide a solution to this problem.

BRIEF DESCRIPTION OF THE INVENTION

The invention provides a cherry destemmer which utilizes the conventional shaking and vibratory process to cause the cherry stems to be erected for removal in a conventional way. However, the invention provides means by which the necessary vibration and shaking utilized to cause the cherries to present their stems in a position for removal is isolated from the equipment's support structure as well as the building. The arrangement not only prevents the transmission of the vibration but also eliminates the problem of fatigue both to personnel and to equipment. These objectives are obtained without materially complicating the equipment.

BRIEF DESCRIPTION OF THE DRAWINGS

FIG. 1 is a side elevation view of a machine incorporating this invention;

FIG. 3 is a plan view of the shaker table illustrated in FIG. 1 with the transport belt installed with portions of the structure at the leveling brush removed;

FIG. 4 is a plan view of the shaker table with the destemming blade and transport belt removed;

DESCRIPTION OF THE PREFERRED EMBODIMENT

Figure 2:
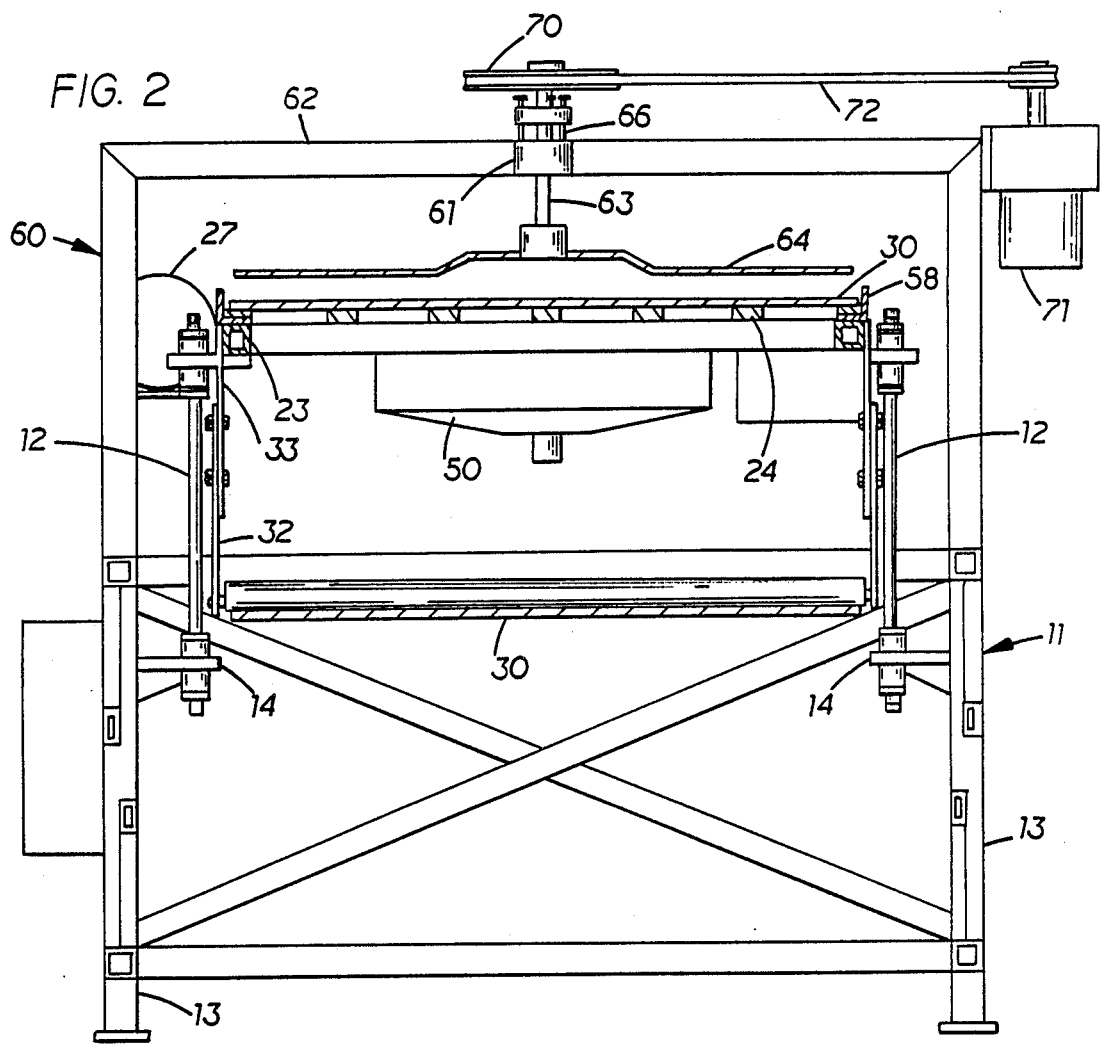
FIG. 2 is an enlarged sectional elevation view taken along the plane II—II of FIG. 1.

Referring to FIG. 1, the numeral 10 refers to a shaker frame which is supported on and above a base frame 11 by four elongated support rods 12. Both the shaker and base frames are generally rectangular in shape and the rods 12 are located adjacent the ends of both frames. The base frame 11 is a rigid member designed to rest on and be secured to a floor. It can have any of a number of designs so long as it is rigid and provides adequate support for the shaker frame and its related equipment. It is provided with four corner legs 13. A support plate 14 extends inwardly from each of the legs. These plates have to support the entire load of the shaker frame 10 and, as a result, each plate is welded to and braced from beneath by gussets 15 which, like the plate 14, are welded to the adjacent leg 13. The lower ends of the support rods 12 are secured to the plates 14.

The upper ends of the rods are secured to the plates 20 which extend laterally outwardly from the shaker frame 10. The shaker frame has a rectangular peripheral frame 21, preferably of square tubing with ends and sides welded together. Tie plates 20 are welded to the bottom face of the sides of the shaker frame. The rods 12 pass through these plates and are secured to them. It will be observed from FIG. 2 that the shaker frame 10 is narrower than the base. At the same time, it is longer than the base frame (FIG. 1). The particular construction of the anchors 17 by which the rods are tied to the plates 14 and 20 will be described subsequently.

The shaker frame has four generally equally spaced cross pieces. The two end ones 22 form the ends of the frame and are welded to the frame's side members 23. The ends 22 are preferably of the same tubular construction as the side members. The shaker frame is also spanned by a pair of cross pieces 22a which are spaced apart to provide an opening between them which is located about the center of the shaker frame. While the cross pieces 22a could also be of square tubing, they are preferably fabricated of heavy structural angle and their ends welded to the sides of the frame.

Figure 8:
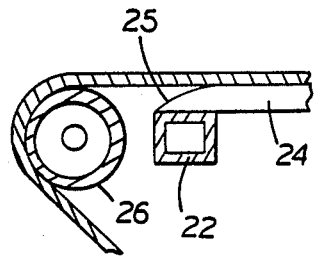
FIG. 8 is a fragmentary, sectional view of a typical end of one of the slats.
Figure 5:
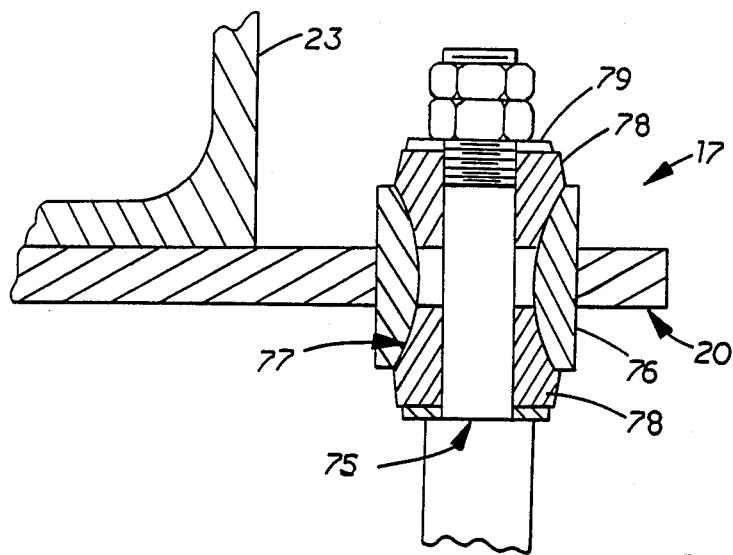
FIG. 5 is an enlarged, fragmentary view of the upper end of one of the rods supporting the shaker table.
Figure 6:
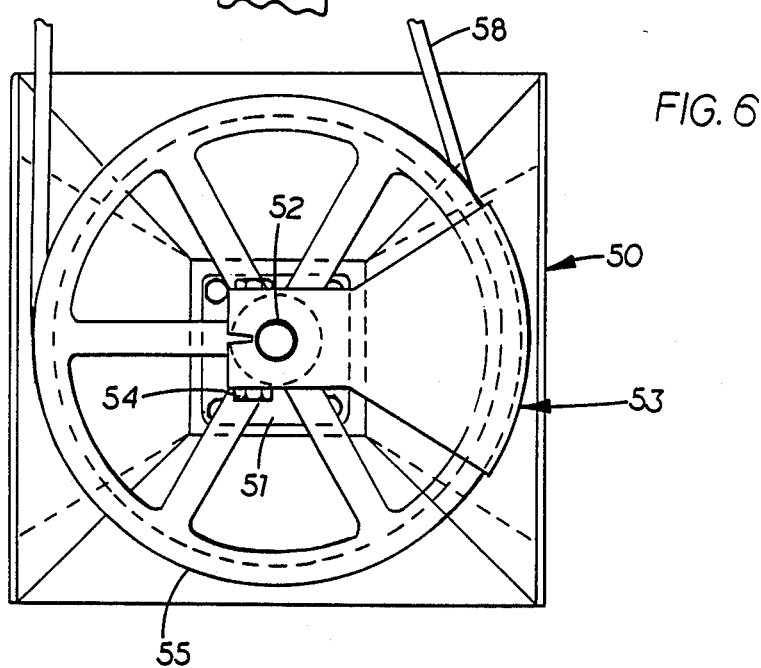
FIG. 6 is an enlarged, fragmentary plan view of the oscillation generator as seen with the transport belt removed.
Figure 7:
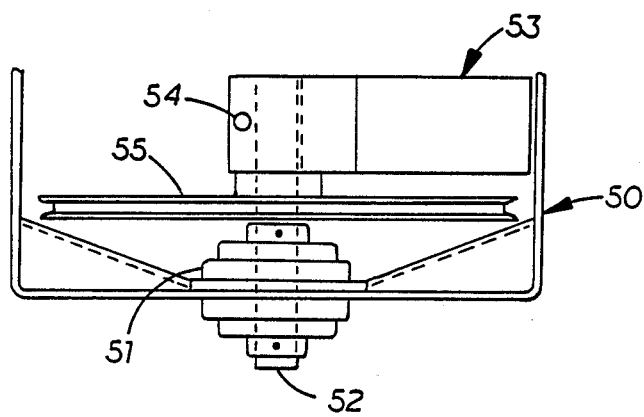
FIG. 7 is a sectional, elevation view of the oscillation generator with a portion of the housing removed.

The top of the shaker frame is formed by a plurality of spaced, parallel slats 24 which extend lengthwise of the frame and are secured at least to the ends 22 of the shaker frame. Because of the functional characteristics of the shaker frame which will be described subsequently, it is preferable that these slats also be secured to the intermediate cross pieces 22a. These slats rest on top of the ends and cross pieces of the frame (FIGS. 5 and 8). It is very important that these slats have a smooth top surface and rounded ends 25, as illustrated in FIG. 8, to eliminate as much as possible wear on the hereinafter described transport belt. For this purpose, it is also desirable that the juncture between the top and side faces of the slats be lightly chamfered.

A belt supporting roller is mounted at each end of the shaker frame. These rollers extend the full width of the frame and are supported at each end by suitable journals. The roller 26 at the discharge end is driven by suitable means, such as the motor 27 through a speed reducer 28 (FIG. 1). The roller 29 at the other end is an idler roller. The rollers 26 and 29 support an endless belt 30 which forms the working surface of the shaker.

Approximately midway between the rollers 26 and 29 a pair of belt tension members 31 extend downwardly from the sides of the shaker frame 10 (FIGS. 1 and 2). Each of the members consists of a pair of elongated plates so attached to each other that the position of the lower ones 32 can be adjusted vertically with respect to the upper ones 33. The upper ones are welded or bolted to one face of the frame. After adjustment, the plates of each member are locked together by suitable means, such as bolts. Extending between the lower ends of the lower ones of the members is a tension roller, the vertical position of which is made adjustable by the tension members 31 to properly tension the belt 30. The roller is rotatably supported on the shaft 34.

Figure 10:
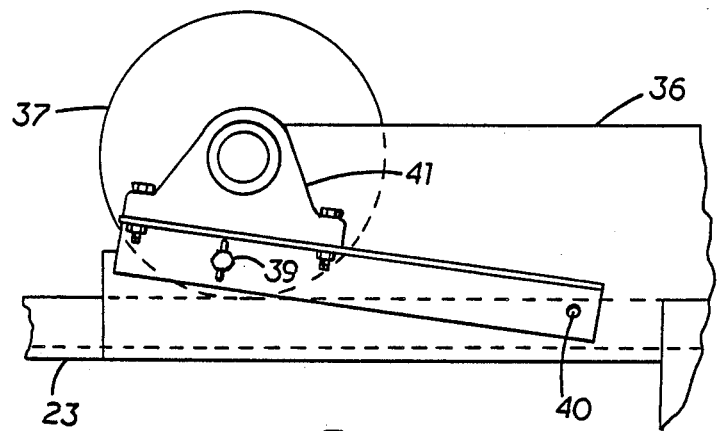
FIG. 10 is an enlarged fragmentary side view of the mounting for the fruit leveling brush.
Figure 9:
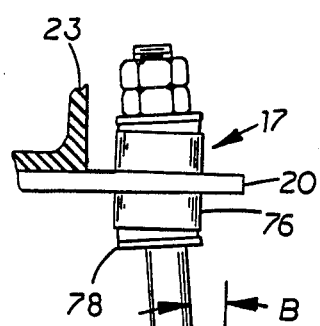
FIG. 9 is an enlarged, fragmentary sectional view taken along the plane IX—IX of FIG. 1.
Figure 9:
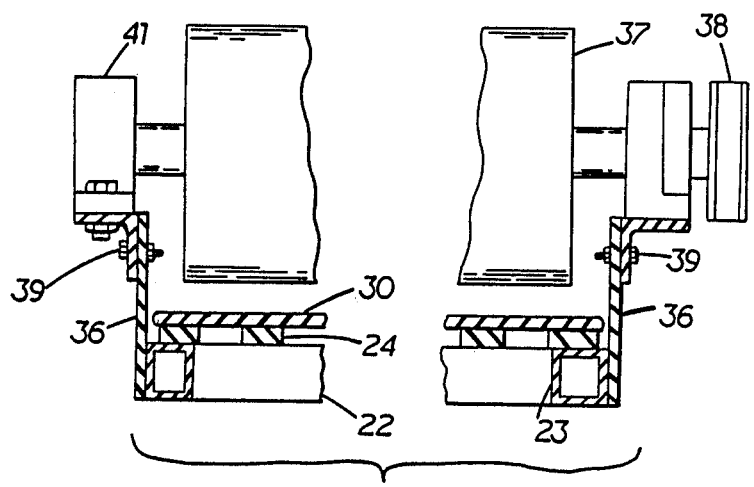

Adjacent the upstream end of the top surface of the belt 30 a pair of upstanding plates 36 are secured to the side frame members 23. Mounted between the plates 36 and extending across the width of the belt is a brush 37. The brush is driven by a belt 38 from the shaft of the idler roller 29 (FIG. 3). By this arrangement, the brush is so rotated that its lower surface will push any fruit it contacts back upstream of the belt. The brush is positioned approximately one-fourth inch above the top surface of a single layer of fruit above the belt's surface. Thus, it effectively prevents more than a single layer of fruit to pass under it into the main portion of the shaker frame. This is important to the effective operation of the invention. The vertical position of the brush can be adjusted by loosening the bolts 39 on each side and raising or lowering the downstream end of the frame which is pivotally anchored to the frame at 40 (FIG. 10). Normally, the total range of vertical adjustment necessary does not exceed one-half inch. However, should greater adjustment be needed, it can be done by placing shims under the bearing block 41.

Substantially midway between the ends of the shaker frame a downwardly recessed shell 50 is mounted to and rigidly supported by the intermediate cross pieces 22a. The center of the shell has a flat area on which is mounted a bearing 51 to support the shaft 52 (FIG. 4). Mounted to the upper end of the shaft is an eccentric weight 53. The weight is locked to the shaft for rotation with it by the bolt 54 which clamps the weight to the shaft. The weight 53 provides a mass which is unevenly distributed circumferentially of the shaft 52.

Mounted to the shaft below the weight is a pulley 55 by which the shaft and eccentric weight 53 are driven from an electric motor 57 by the belt 58. The motor 57 is mounted to a support which in turn is secured to one of the side members 22a of the shaker frame and also to one of the intermediate cross pieces 23.

Figure 11:
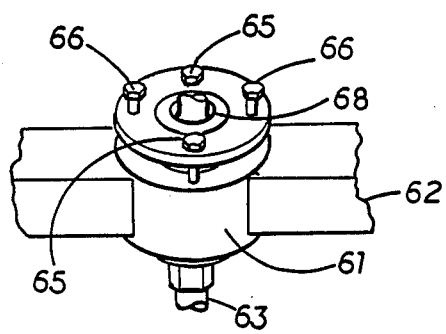
FIG. 11 is a fragmentary oblique view of the mechanism for adjusting the height of the destemming blade.

Aligned above the shaft 52 for the eccentric 53 an inverted, U-shaped frame 60 is mounted to the base frame 11 and spans the shaker frame 10 (FIGS. 2 and 3). Centered between the sides of the base frame a bearing 61 is mounted on the cross member 62 of the frame 60. The bearing supports a vertical shaft 63, the lower end of which mounts a destemmer blade 64. The width of the blade is equal to that of the belt 30. The blade 64 is positioned such that it is from one-eighth to one-fourth inch above the top of the layer of fruit on the belt 30. Since the size of the fruit varies with the type of cherry, the time in the season the fruit was picked and the particular weather conditions under which the fruit was grown, it is necessary to be able to adjust the spacing between the blade 64 and the surface of the belt 30. For this purpose, the bolts 65 are loosened and the bolts 66 turned down to raise the cap 67 (FIG. 11). Because the shaft 63 is flanged at 68, this will lift the shaft and the blade 64 together with the cap. The bolts 65 are then tightened to position the cap and shaft. When such an adjustment is made, it is not necessary to adjust the position of the pulley 70 because the adjustments will be small, such as less than one-half inch for a fruit such as cherries. The blade is driven by an electric motor 71 by means of the belt 72.

The shaker frame 10 is entirely supported on the rods 12. At each end, the rods are provided with anchors 17. The construction of the anchors is detailed in FIG. 5. The rods are preferably of cold rolled steel and have a nominal diameter of one inch. To mount the anchors, both ends of the rods have a section of reduced diameter terminating in a shoulder 75. The preferred length of the rods between the shoulders is thirteen to fourteen inches. Where the ends of the rod pass through the plates 12 and 20 a collar 76 is welded to the plate and extends beyond both faces of the plate. The bore of the collar is generally hyperboloid in shape forming a throat 77 of reduced diameter midway between the ends. The throat is of substantially greater diameter than that of the reduced end of the rod which passes through it. The rod is surrounded by a pair of bushings 78 of tapered shape, one seated in each end of the throat 77. Preferably, the bushings are molded of rubber or a synthetic elastomeric material, such as urethane, having a durometer of 60-70. The bushings are so designed that their inner ends are spaced apart and their outer ends are too large to be forced entirely into the throat 77 and, thus, the ends project beyond the ends of the collar 76. The outer ends of the bushings bear against washers 79. By tightening the nuts so the bushings are compressed and resiliently but with substantial resistance support the rods but with a sufficient degree of resilience to absorb the motion of the shaker frame, the use of the second nut locks the first one against loosening during an operation. Although only an upper anchor 17 is illustrated in FIG. 5, it is to be understood that all eight anchors are alike.

OPERATION

Figure 12:
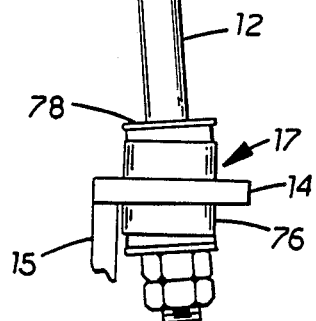
FIG. 12 is an enlarged fragmentary sectional view of one of the shaker frame supports taken along the plane XII—XII of FIG. 1 with the rod deflection exaggerated.

In assembling the invention, after the shaker frame and the equipment which is supported by that frame has been assembled to it, the nuts which adjust the compression of the bushings are tightened. The amount of compression applied to the bushings is such that oscillatory, pivotal motion of the rods can occur at each anchor. The compression applied to the bushings such that the rods are permitted to oscillate and trace limited oscillation, rocking motion at both ends of sufficient magnitude to absorb all or substantially all of the motion and vibration generated by the eccentric weight 53. This is accomplished without any significant flexing of the rods 12. It is important that the motion resulting from use of the eccentric be effective in turning the cherries without creation of vibration which cannot be effectively absorbed. It has been found that it is important that the motion created by the machine be oscillatory rather than circular. To do this, the rods are forcibly inclined laterally of the machine about one-half inch at the time of installation, see B in FIG. 12. As so inclined, in their stationary position, they are straight lengthwise of the machine but lean inwardly toward the machine's centerline. This tends to cause what would otherwise be a circular motion to assume a more prolate or oblate ellipsoidal motion with the greater dimension of the motion being lengthwise of the belt 30. Such a motion tends to accelerate movement of the cherries through the machine while limiting the tendency of the machine to cause them to be discharged off the sides of the belt.

As seen in FIG. 2, a side rail 58 extends along each side of the belt. It has a height of one-half to five-eighths of an inch above the surface of the belt and is secured to the side frame members 23. The side rails prevent any of the cherries from being discharged from the sides of the belt. If the side rails are thinner than the slats 24, a special slat 59 is mounted on top to support the edges of the belt. The side rails have been omitted from all of the drawing figures except FIG. 2 for the sake of clarity.

After the vertical position of the brush 37 has been set to pass a single layer of the cherries but deny passage of more than a single layer of the fruit, the motors driving the brush 37, belt 30 and the stripper blade 64 are started. The eccentric weight causes the shaker frame 10 to oscillate rapidly. Operation of eccentric weight at 250 revolutions per minute has been found to produce very satisfactory results. The destemmer blade 64 has a diameter such that it extends entirely across the surface of the belt 30. A belt speed of approximately 135 feet per minute has been found to be effective in destemming the fruit. In this process, every individual fruit even adjacent the edges of the belt is beneath the blade during enough revolutions to assure that at least once its stem was in the path of the blade. Thus, adequate exposure time is provided to assure that every individual fruit having a stem will be caused to rotate into a position in which its stem will be contacted by the blade. Since the blade passes over the fruit close to the base of the stem, the inertia of the fruit will result in separation of the stem from the fruit without dislodging the fruit from the belt. To prevent breakage of the stem, the leading edge of the blade 64 is square or rounded. The separated stems are discharged by centrifugal force off the end of the blade. Most of the detached stems are discharged to the side of the shaker frame. Some, however, may be deposited on the fruit. This latter does not cause a problem because after destemming the cherries will be washed. The washing will remove the detached stems which will tend to float while the cherries sink.

Figure 13:
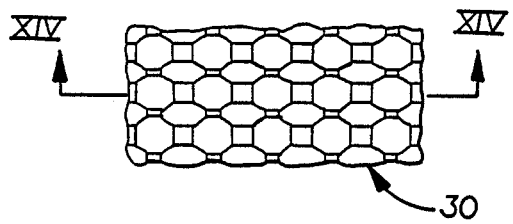
FIG. 13 is an enlarged fragmentary view of the surface of the belt.
Figure 14:
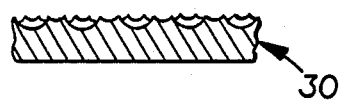
FIG. 14 is a fragmentary sectional view taken along the plane XIV—XIV of FIG. 13.

The use of a belt with a pebbled surface is important in resisting migration of the fruit on the belt surface. The belt must be of materials approved for use with food. A three-ply belt of either nitrile or BUNA-N has proven to be effective. The surface texture of the belt is illustrated in FIGS. 13 and 14. Thus, the oscillatory motion of the shaker frame is able to cause the fruit to rotate about the center of the fruit rather than migrate over the belt surface. There is very little tendency of the fruit to discharge over the sides of the belt or to move lengthwise of the belt in either a direction or speed greater than that of the belt.

The invention provides a machine capable of effectively and dependably destemming a fruit such as cherries. At the same time, it effectively eliminates the shake and vibration which has been characteristic of previously known equipment having the same purpose. By isolating substantial portions of the equipment from the effects of the use of the eccentric weight, the life of the equipment is extended and its service requirements are materially reduced. By reshaping the path traced by the shaker frame, the effectiveness and processing capacity of the equipment has been materially improved.

Having described the preferred embodiment of the invention, it will be recognized that modifications can be made without departing from the principles of the invention. Such modifications are to be considered as included in the hereinafter appended claims, unless these claims by their language expressly state otherwise.

I claim:

1. Means for removing stems from cherries, said means having rectangular main and secondary frames; vertical means supporting said secondary frame on and between the sides of said main frame, said vertical means being rods having lower and upper ends, one secured to said secondary frame on each side thereof adjacent each of its corners, first motion absorbing resilient bearings for anchoring the lower ends of each of said rods to said main frame and second motion absorbing resilient bearings for anchoring the upper ends of said rods to said secondary frame; a source of oscillatory motion secured to said secondary frame, said source generating oscillatory motion in a horizontal plane while maintaining a substantially stationary vertical position; an endless belt mounted on said secondary frame forming a fruit transport surface and means for causing said surface to move from end to end of said secondary frame; a destemming blade mounted at its center, above and spaced from said surface just enough to avoid contact with any of the fruit on the surface, said blade having a length substantially equal to the width of the surface; drive means for rotating the blade, said blade and its drive means being supported on said main frame; said resilient bearings absorbing the oscillatory motion of said secondary frame whereby it is not transmitted to said main frame.

2. The means for removing stems from cherries described in claim 1 wherein a rigid arch is mounted on said main frame and extends laterally over said secondary frame substantially midway between its ends, said blade and its drive means being mounted on said arch.

3. The means for removing stems from cherries described in claim 1 wherein the oscillatory motion of said secondary frame is entirely absorbed by the resilient flexing of said resilient bearings.

4. The means for removing stems from cherries described in claim 1 wherein the belt has a fruit contacting surface shaped to restrain the fruit against significant movement laterally of the belt surface while allowing the fruit to rotate about its geometric center so that at least at one time during its passage beneath the blade its stem will assume an upwardly extending position in the path of said blade.

5. Means for removing stems from cherries, said means having a base frame and a shaker frame; an endless fruit transport belt mounted on said shaker frame and means for driving said belt; support means supporting said shaker frame on and above said base frame; said support means comprising a pair of vertical elongated rods on each side of said shaker frame, said rods being spaced apart lengthwise of said shaker frame; an anchor member at each end of each rod for securing one end of the rod to the base frame and the other end to the shaker frame; each of said anchor members having resilient bushings surrounding the rod attached thereto permitting limited resilient deviation of the axis of the rod from the central axis of the bushing, means for causing said shaker frame to move in a horizontal plane both lengthwise and laterally with said resilient bushings absorbing substantially all of said movement without transmitting it to the base frame.

6. The means for removing stems from cherries described in claim 5 wherein the rods forming each pair aligned transversely of the belt are placed under tension by the tops thereof being forcibly inclined toward each other as secured to the anchor members attaching them to the shaker frame.

7. The means for removing stems from cherries described in claim 6 wherein the upper end of each of said rods is displaced approximately one-half inch from the position it would have assumed if no inwardly acting force had been applied to it.

* * * * *